US009124830B2

(12) United States Patent
Ogura et al.

(10) Patent No.: US 9,124,830 B2
(45) Date of Patent: Sep. 1, 2015

(54) PHOTOELECTRIC CONVERSION APPARATUS AND IMAGING SYSTEM

(71) Applicant: CANON KABUSHIKI KAISHA, Tokyo (JP)

(72) Inventors: Masanori Ogura, Tokyo (JP); Tomohisa Kinugasa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/185,376

(22) Filed: Feb. 20, 2014

(65) Prior Publication Data

US 2014/0253774 A1     Sep. 11, 2014

(30) Foreign Application Priority Data

Mar. 8, 2013   (JP) .................................. 2013-047031

(51) Int. Cl.
| | |
|---|---|
| H04N 3/14 | (2006.01) |
| H04N 5/335 | (2011.01) |
| H04N 5/361 | (2011.01) |
| H04N 5/374 | (2011.01) |
| H04N 5/355 | (2011.01) |
| H01L 31/062 | (2012.01) |
| H01L 31/113 | (2006.01) |

(52) U.S. Cl.
CPC .............. *H04N 5/361* (2013.01); *H04N 5/3559* (2013.01); *H04N 5/374* (2013.01)

(58) Field of Classification Search
CPC ..... H04N 5/357; H04N 5/3653; H04N 5/361; H04N 5/2176; H04N 5/378; H04N 5/374; H04N 5/3741
USPC ........... 348/241, 243, 300–308; 257/291, 292
See application file for complete search history.

(56) References Cited

U.S. PATENT DOCUMENTS

| | | | |
|---|---|---|---|
| 5,121,225 | A | 6/1992 | Murata et al. |
| 5,475,211 | A | 12/1995 | Ogura et al. |
| 7,227,208 | B2 | 6/2007 | Ogura et al. |
| 7,321,110 | B2 | 1/2008 | Okita et al. |
| 7,408,210 | B2 | 8/2008 | Ogura et al. |
| 7,456,880 | B2 | 11/2008 | Okita et al. |
| 7,460,162 | B2 | 12/2008 | Koizumi et al. |
| 7,514,732 | B2 | 4/2009 | Okita et al. |
| 7,550,793 | B2 | 6/2009 | Itano et al. |

(Continued)

FOREIGN PATENT DOCUMENTS

JP      2011/139427 A      7/2011

*Primary Examiner* — Kelly L Jerabek
(74) *Attorney, Agent, or Firm* — Fitzpatrick, Cella, Harper & Scinto

(57) ABSTRACT

The present invention provides a photoelectric conversion apparatus capable of preventing dark current noise due to a leakage current of a transistor and improving the signal-to-noise ratio. A photoelectric conversion apparatus includes a pixel which in turn includes a photoelectric conversion element adapted to convert light into an electric charge, buffers whose input terminals are connected to an output terminal of the photoelectric conversion element and which buffer a voltage corresponding to the electric charge of the photoelectric conversion element, a capacitor whose first electrode is connected to an output terminal of the photoelectric conversion element, a first switch connected between a second electrode of the capacitor and output terminals of the buffers, and a second switch connected between the second electrode of the capacitor and a fixed voltage node.

11 Claims, 5 Drawing Sheets

(56) References Cited

U.S. PATENT DOCUMENTS

| | | |
|---|---|---|
| 7,605,415 B2 | 10/2009 | Koizumi et al. |
| 7,629,568 B2 | 12/2009 | Koizumi et al. |
| 7,638,826 B2 | 12/2009 | Hiyama et al. |
| 7,679,658 B2 | 3/2010 | Sakurai et al. |
| 7,692,713 B2 | 4/2010 | Kinugasa et al. |
| 7,719,587 B2 | 5/2010 | Ogura et al. |
| 7,808,537 B2 | 10/2010 | Fujimura et al. |
| 7,812,873 B2 | 10/2010 | Hiyama et al. |
| 7,812,876 B2 | 10/2010 | Hiyama et al. |
| 7,907,196 B2 | 3/2011 | Ogura et al. |
| 7,948,540 B2 | 5/2011 | Ogura et al. |
| 8,169,525 B2 | 5/2012 | Ryoki et al. |
| 8,174,600 B2 | 5/2012 | Ogura et al. |
| 8,218,050 B2 | 7/2012 | Ogura et al. |
| 8,411,178 B2 | 4/2013 | Ogura et al. |
| 8,477,224 B2 | 7/2013 | Ogura et al. |
| 8,493,487 B2 | 7/2013 | Takada et al. |
| 8,520,102 B2 | 8/2013 | Ogura et al. |
| 8,605,182 B2 | 12/2013 | Totsuka et al. |
| 2001/0030701 A1* | 10/2001 | Hiyama et al. ............... 348/304 |
| 2006/0221667 A1* | 10/2006 | Ogura et al. ............... 365/149 |
| 2009/0021622 A1* | 1/2009 | Kume ............... 348/302 |
| 2010/0309357 A1* | 12/2010 | Oike ............... 348/302 |
| 2011/0134286 A1 | 6/2011 | Inoue et al. |
| 2011/0242381 A1* | 10/2011 | Sakakibara et al. ............ 348/301 |
| 2013/0026349 A1 | 1/2013 | Kinugasa |
| 2013/0107095 A1* | 5/2013 | Yarino et al. ............... 348/302 |
| 2014/0253767 A1 | 9/2014 | Kato et al. |

\* cited by examiner

PHOTOELECTRIC CONVERSION APPARATUS AND IMAGING SYSTEM

BACKGROUND OF THE INVENTION

1. Field of the Invention

The present invention relates to a photoelectric conversion apparatus and imaging system.

2. Description of the Related Art

A photoelectric conversion apparatus of a CMOS image sensor includes a pixel including a photoelectric conversion element, a read circuit adapted to read a signal resulting from photoelectric conversion performed by the pixel. Also, depending on a reading system and added functions, the photoelectric conversion apparatus includes a sensitivity switching circuit, a sampling and holding circuit, a scanning circuit, and the like.

FIG. 2 of Japanese Patent Application Laid-Open No. 2011-139427 discloses a circuit diagram showing configurations of a unit pixel and transfer unit of a photoelectric conversion apparatus. The photoelectric conversion apparatus includes a MOS transistor and capacitor for sensitivity switching. Description will be given of a case in which the capacitor is electrically cut off from an input terminal with the MOS transistor turned off. There is an energy band gap between a valence band and conduction band. At a pn junction between a source region and sub-gate region of the MOS transistor, energy band gap width in a direction from the source region toward the region under the gate is smaller than when the MOS transistor is on. Consequently, electrons tend to get across the energy band gap in a forward direction, making it easier for a tunneling current to occur. The tunneling current becomes a dark current of the photoelectric conversion apparatus. The tunneling current produced when the MOS transistor is off is accumulated on the input terminal or capacitor to become a dark current. The dark current, which is a noise, has a problem of reducing a signal-to-noise ratio of the photoelectric conversion apparatus.

SUMMARY OF THE INVENTION

According to an aspect of the present invention, a photoelectric conversion apparatus comprises a pixel, wherein the pixel includes: a photoelectric conversion element configured to convert light to an electric charge; a buffer having an input terminal connected to an output terminal of the photoelectric conversion element, to perform a buffering of a voltage based on the electric charge of the photoelectric conversion element; a capacitor having a first electrode connected to the output terminal of the photoelectric conversion element; a first switch connected between a second electrode of the capacitor and an output terminal of the buffer; and a second switch connected between the second electrode of the capacitor and a fixed voltage node.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
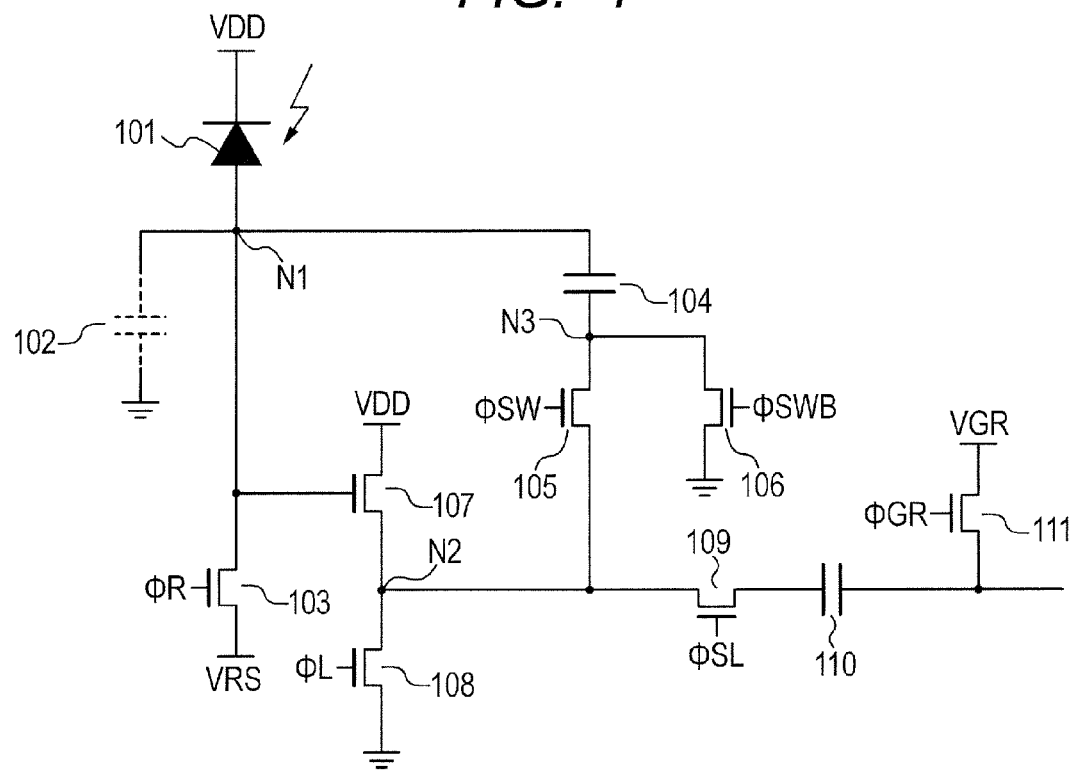
FIG. 1 is a circuit diagram showing a configuration example of a photoelectric conversion apparatus according to a first embodiment.

FIG. 1 is a circuit diagram showing a configuration example of a photoelectric conversion apparatus according to a first embodiment of the present invention. The photoelectric conversion apparatus has a pixel and a read circuit corresponding to the pixel. A photoelectric conversion element 101 is, for example, a photodiode. The photoelectric conversion element 101, whose anode is connected to a node N1 and whose cathode is connected to a node of a power supply voltage VDD, is adapted to convert light into an electric charge and accumulate the electric charge. An output terminal of the photoelectric conversion element 101 is connected to the node N1. A capacitor 102 is connected between the node N1 and a ground potential node and adapted to accumulate an electric charge and is, for example, a parasitic capacitor. A resetting MOS transistor 103, which has its source connected to a node of a reset voltage VRS, its gate connected to a node of a voltage φR, and its drain connected to the node N1, is a reset portion adapted to reset the electric charge of the photoelectric conversion element 101. A capacitor 104 is adapted to accumulate an electric charge for sensitivity switching and is connected between the node N1 and a node N3. A first electrode of the capacitor 104 is connected to the node N1 and a second electrode of the capacitor 104 is connected to the node N3. A sensitivity switching MOS transistor 105 has its drain connected to the node N3, its gate connected to a node of a voltage φSW, and its source connected to a node N2. A sensitivity switching MOS transistor 106 has its drain connected to the node N3, its gate connected to a node of a voltage φSWB, and its source connected to the ground potential node. A MOS transistor 107 making up a source follower has its drain connected to the node of the power supply voltage VDD, its gate connected to the node N1, and its source connected to the node N2. A MOS transistor 108, which is a constant current load of the source follower, has its drain connected to the node N2, its gate connected to a node of a voltage φL, and its source connected to the ground potential node. The transistors 107 and 108 make up buffers (source follower circuits). Input terminals of the buffers 107 and 108 are connected to the node N1 and output terminals of the buffers 107 and 108 are connected to the node N2. The MOS transistor 105, which is a first switch connected between the second electrode (node N3) of the capacitor 104 and the output terminals (node N2) of the buffers 107 and 108, turns on when the voltage φSW goes High. The MOS transistor 106, which is a second switch connected between the second electrode (node N3) of the capacitor 104 and a fixed voltage node (the ground potential node), turns on when a voltage φSWB goes High. A MOS transistor 109 for pixel selection has its drain connected to the node N1 and its gate connected to a node of a voltage φSL. A clamp capacitor 110 is connected between the source of the transistor 109 and the source of a transistor 111. The MOS transistor 111 has its drain connected to a node of a voltage VGR, its gate connected to a node of a voltage φGR, and its source connected to an output terminal. According to the present embodiment, the read circuit includes the MOS transistor 109, the clamp capacitor 110, and the MOS transistor 111 while the pixel includes an element other than those described above.

Figure 2:
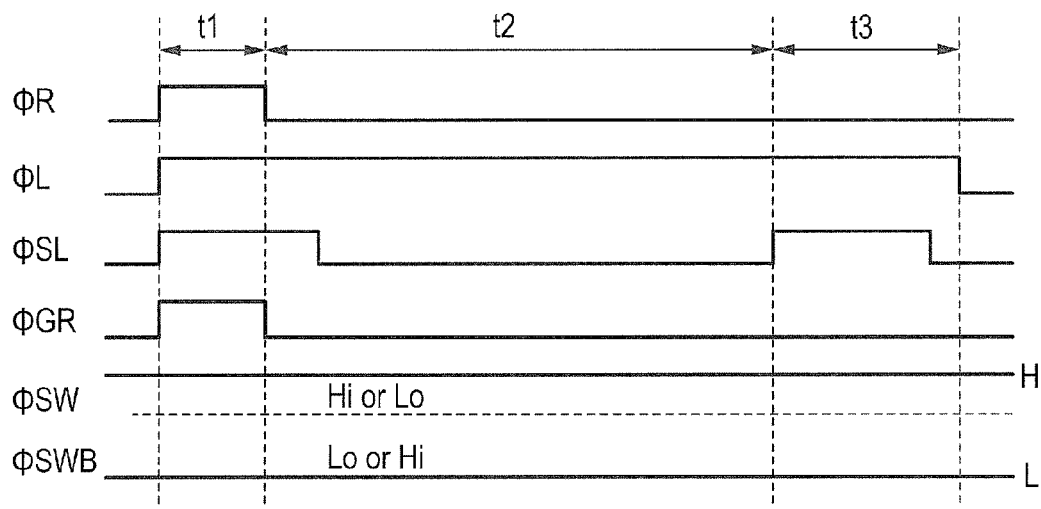
FIG. 2 is a timing chart describing operation of the photoelectric conversion apparatus according to the first embodiment.

FIG. 2 is a timing chart for describing an exemplary operation of the photoelectric conversion apparatus shown in FIG. 1. The voltage φSW remains High (or Low). The voltage φSWB remains Low (or High). First, voltages φR, φL, φSL, φGR become High in period t1, and an initialization process is carried out. When the voltage φR goes High, the resetting MOS transistor 103 turns on, causing a reset voltage VRS to be supplied to the photoelectric conversion element 101 and the capacitors 102 and 104, and consequently the photoelectric conversion element 101 and the capacitors 102 and 104 are initialized/reset to the reset voltage VRS. Subsequently, voltages φR and φGR become Low in a charge accumulation period t2. When the voltage φR goes Low, the MOS transistor 103 turns off, bringing the node N1 into a floating state. The photoelectric conversion element 101 converts incident light into an electric charge. The electric charge is accumulated in the capacitors 102 and 104 and subjected to charge-to-voltage conversion. The capacitors 102 and 104 act as detection capacitors. A source follower circuit, which are made up of the MOS transistors 107 and 108 and adapted to act as a buffer, buffer and output a voltage of the node N1 to the node N2. An offset corresponding to a gate-to-source voltage of the MOS transistor 107 occurs in electric potentials of the nodes N1 and N2, and changes in the electric potentials of the nodes N1 and N2 follow the offset with a one-fold gain.

When the MOS transistor 106 remains on with the voltage φSWB set High and the MOS transistor 105 remains off with the voltage φSW set Low, the electrode node N3 paired with that electrode of the capacitor 104 which is connected to the node N1 is clamped at a fixed voltage, for example, to the ground potential. In that case, the capacitor 104 acts as a detection capacitor and a combination of the capacitor 102 and capacitor 104 is equal to the detection capacitor, which means a low charge conversion coefficient, and thus a low sensitivity mode (second mode) is entered.

On the other hand, description will be given of a case in which the MOS transistor 105 remains on with the voltage φSW set High and the MOS transistor 106 remains off with the voltage φSWB set Low. In that case, the electrode node N3 paired with that electrode of the capacitor 104 which is connected to the node N1 is connected to the output node N2 of the source follower. When the MOS transistor 107 is on, changes in the potential of the node N1 are identical to changes in the potential of the node N2, and thus the capacitor 104 does not act as a detection capacitor. Consequently, only the capacitor 102 acts as a detection capacitor, which means a high charge conversion coefficient, and thus a high sensitivity mode (first mode) is entered.

Finally, the voltage φSL becomes High in period t3. Consequently, the MOS transistor 109 turns on, the potential at the output node N2 of the source follower is clamped by the capacitor 110 and the MOS transistor 111, the potential with noise subtracted is output from the source of the transistor 111 to a succeeding stage via an output terminal.

According to the present embodiment, the sources or drains of the MOS transistors 105 and 106 for sensitivity switching are not connected to the node N1. Therefore, a tunneling current produced when one of the MOS transistors 105 and 106 for sensitivity switching is off is not accumulated in the floating electrode node N1 connected with the capacitor 102 and capacitor 104. Even if a tunneling current produced during an off period of the MOS transistors 105 and 106 flows into the nodes N3 and N2, the tunneling current is absorbed by the constant current source 108 of the gland potential node or source follower, and thus the potentials of the nodes N2 and N3 do not fluctuate. This enables preventing dark current noise due to a tunneling current and improving a signal-to-noise ratio.

Figure 3:
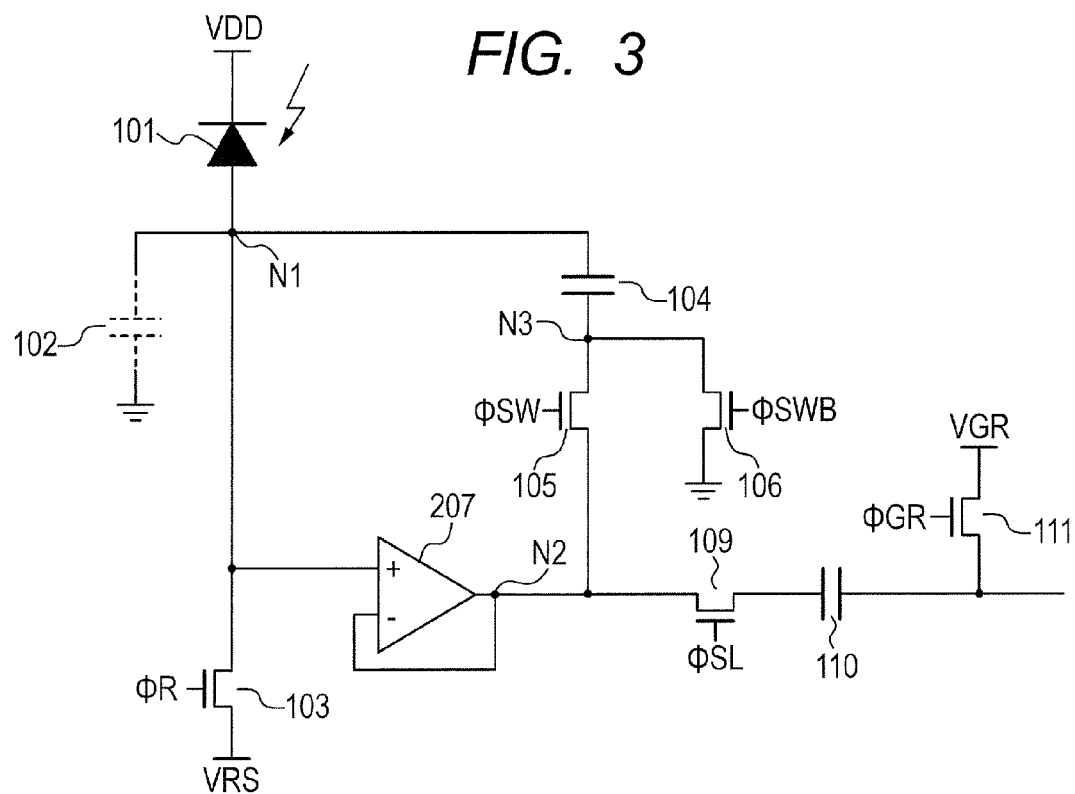
FIG. 3 is a circuit diagram showing a configuration example of the photoelectric conversion apparatus according to the first embodiment.

FIG. 3 is a circuit diagram showing another configuration example of the photoelectric conversion apparatus according to the present embodiment. The photoelectric conversion apparatus of FIG. 3 includes an amplifier (buffer) 207 instead of the transistors 107 and 108 included in the photoelectric conversion apparatus of FIG. 1. The source follower made up of the MOS transistors 107 and 108 in FIG. 1 has been replaced with a voltage follower which uses the amplifier 207 of FIG. 3. The amplifier 207 has its positive input terminal connected to the node N1, and its negative input terminal and output terminal connected to the node N2. The photoelectric conversion apparatus of FIG. 3 provides advantages similar to those of the photoelectric conversion apparatus shown in FIG. 1.

Figure 4:
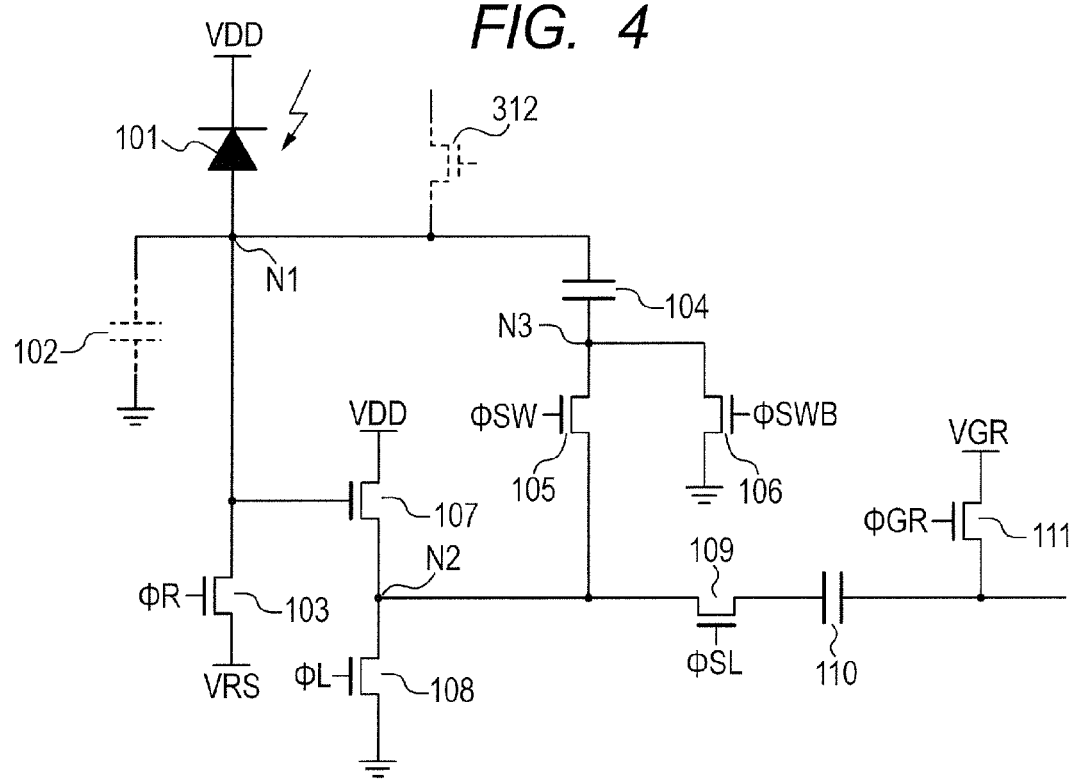
FIG. 4 is a circuit diagram showing a configuration example of the photoelectric conversion apparatus according to the first embodiment.

FIG. 4 is a circuit diagram showing another configuration example of the photoelectric conversion apparatus according to the present embodiment. Compared to the photoelectric conversion apparatus of FIG. 1, the photoelectric conversion apparatus of FIG. 4 additionally includes a MOS transistor 312. A source or drain of the MOS transistor 312 is connected to the node N1. The source or drain of the MOS transistor 312 may be connected to add some functions to the node N1. Even in that case, if the MOS transistor 312 remains on at least during the charge accumulation period t2, no tunneling current will be generated, and consequently an impact of dark current noise can be prevented. For example, if the photoelectric conversion apparatus includes plural pixels, the MOS transistor 312 can be provided between the nodes N1 of adjacent pixels. In this case, signals of the adjacent pixels can be added by turning on the MOS transistor 312.

Second Embodiment

Figure 5:
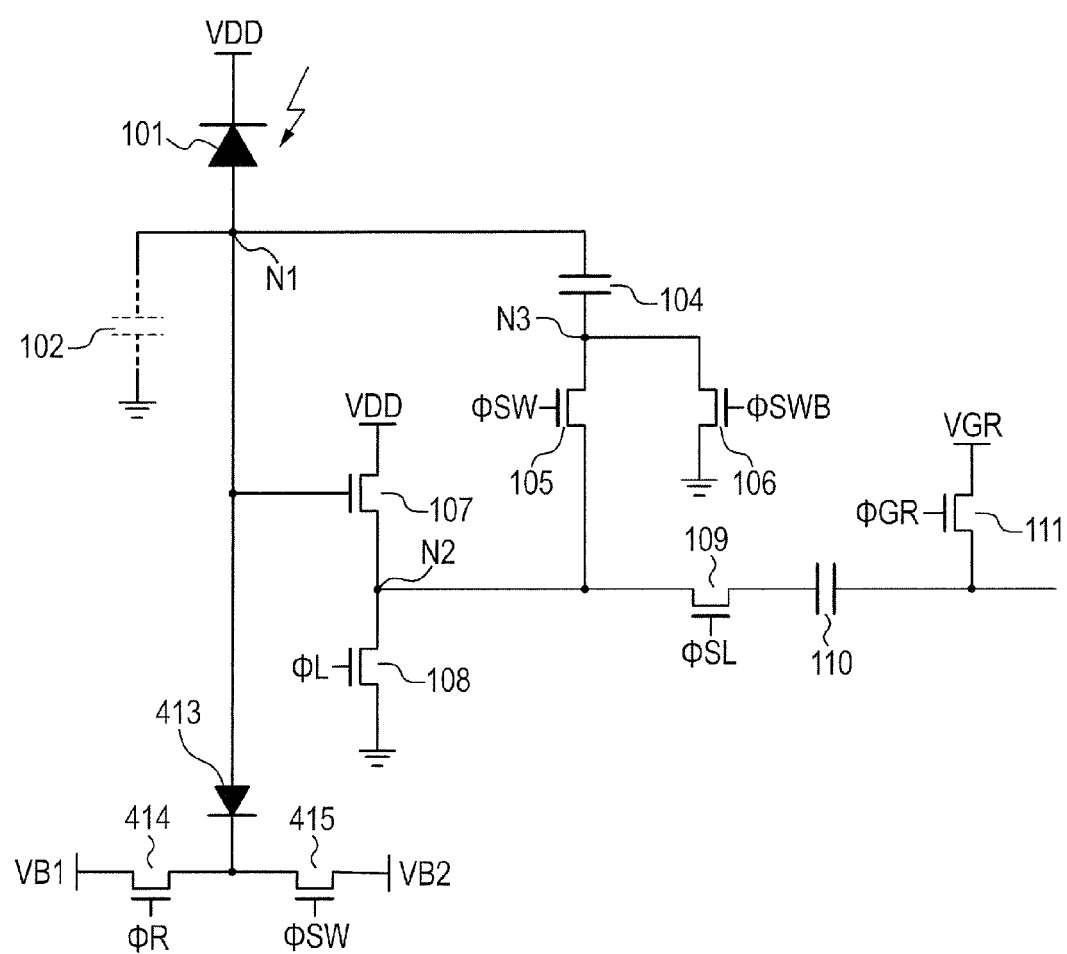
FIG. 5 is a circuit diagram showing a configuration example of a photoelectric conversion apparatus according to a second embodiment.

FIG. 5 is a circuit diagram showing a configuration example of a photoelectric conversion apparatus according to a second embodiment of the present invention. The photoelectric conversion apparatus of FIG. 5 includes a diode 413 and MOS transistors 414 and 415 instead of the MOS transistor 103 included in the photoelectric conversion apparatus of FIG. 1. Differences of the present embodiment from the first embodiment will be described below. An anode of the reset diode 413 is connected to the node N1. The MOS transistor 414 has its drain connected to a cathode of the diode 413, its gate connected to the node of the voltage φR, and its source connected to a node of a voltage VB1. The MOS transistor 415 has its drain connected to the cathode of the diode 413, its gate connected to a node of a voltage φRB, and its source connected to a node of a voltage VB2.

To reset the photoelectric conversion element 101 and the capacitors 102 and 104, the reset diode 413 is operated so as to conduct in a forward direction. When the voltage relationship VB1<VB2 holds, the voltage φR becomes High, turning on the MOS transistor 414, and thereby applying the voltage VB1 to the cathode of the diode 413. Here, the voltage VB1 is lower than the potential of the anode node N1 by a voltage equal to or higher than a forward voltage Vf of the diode 413. Consequently, the node N1 can be reset at a potential of (VB1+Vf) [V] by passing a current from the anode to the cathode of the diode 413 with the reset diode 413 conducting in the forward direction. To finish a reset operation, the voltage φR becomes Low, turning off the MOS transistor 414, the voltage φRB becomes High, turning on the MOS transistor 415 and the voltage VB2 is applied to the cathode of the diode 413. The reset operation can be cancelled by setting the voltage VB2 higher than the potential of the anode node N1 by a voltage equal to the forward voltage Vf, and thereby reverse-biasing the reset diode 413. The transistors 414 and 415, which serve as a bias portion, supply a forward bias voltage VB1 or reverse bias voltage VB2 to the cathode of the diode 413.

Compared to the first embodiment, the second embodiment eliminates the source or drain region of a MOS transistor (e.g., the transistor 103) connected to the node N1, thereby preventing a dark current due to a tunneling current and further improving the signal-to-noise ratio.

Third Embodiment

Figure 6:
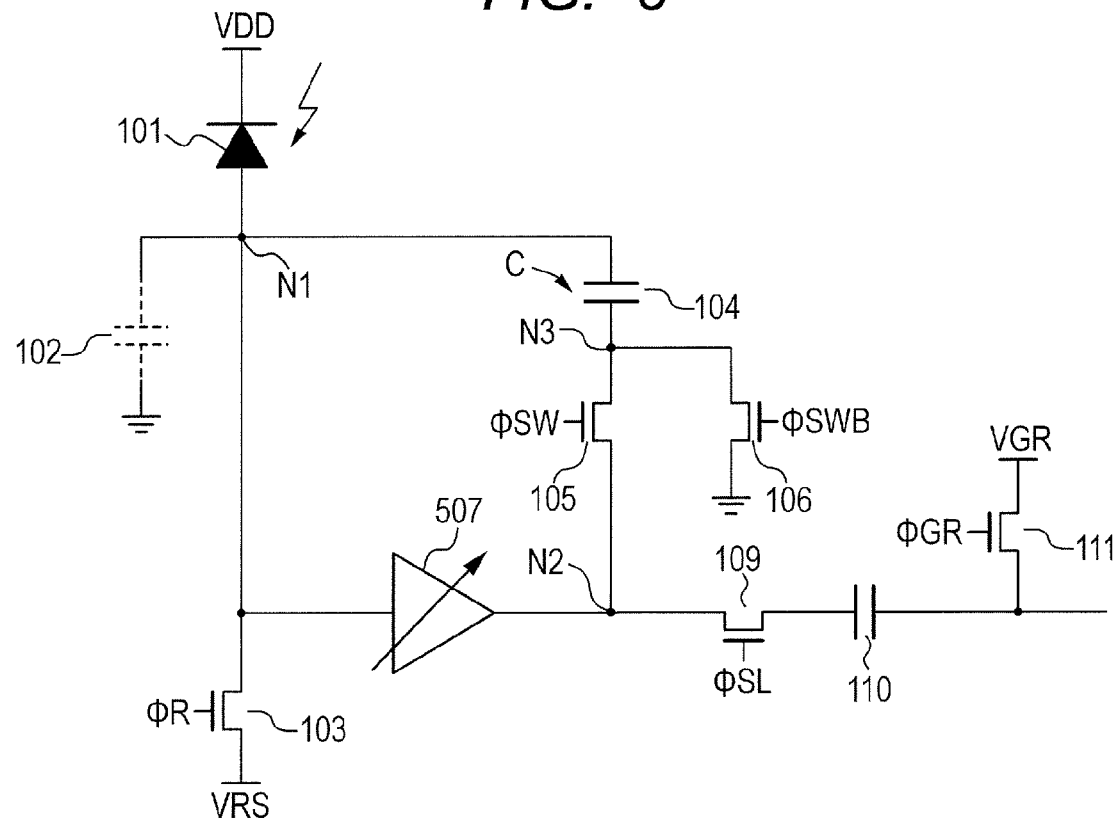
FIG. 6 is a circuit diagram showing a configuration example of a photoelectric conversion apparatus according to a third embodiment.

FIG. 6 is a circuit diagram showing a configuration example of a photoelectric conversion apparatus according to a third embodiment of the present invention. The photoelectric conversion apparatus of FIG. 6 includes a variable gain amplifier (buffer) 507 instead of the MOS transistors 107 and 108 included in the photoelectric conversion apparatus of FIG. 1. The variable gain amplifier 507 has its input terminal connected to the node N1, and its output terminal connected to the node N2.

When the MOS transistor 105 remains on with the voltage φSW set High and the MOS transistor 106 remains off with the voltage φSWB set Low, if gain of the variable gain amplifier 507 is changed, an effective capacitance value of the capacitor 104 can be made variable. A capacitance value of the capacitor 104 is assumed to be C. For example, when the gain of the variable gain amplifier 507 is set to 0.5 times, the effective capacitance value of the capacitor 104 becomes 0.5 C, and when the gain of the variable gain amplifier 507 is set to 0.2 times, the effective capacitance value of the capacitor 104 becomes 0.8 C. Also, when the gain of the variable gain amplifier 507 is set to −1, the effective capacitance value of the capacitor 104 becomes 2 C, and when the gain of the variable gain amplifier 507 is set to −2, the effective capacitance value of the capacitor 104 becomes 3 C. By varying the gain of the variable gain amplifier 507, the charge conversion coefficient can be made variable. In this way, a gain range in which the changes in the potential of the node N1 will be smaller than the changes in the potential of the node N2 is used, that is, the gain of the variable gain amplifier 507 is set to 1 or less. Also, by making the gain of the variable gain amplifier 507 negative, the effective capacitance value of the capacitor 104 can be increased without increasing a layout area of the capacitor 104.

Figure 7:
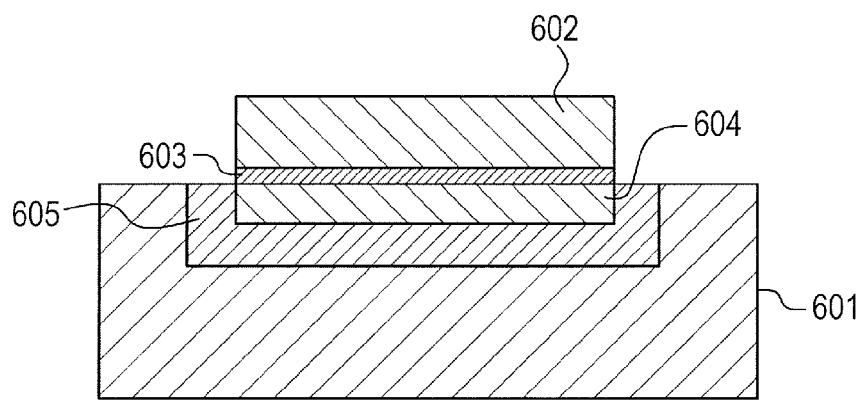
FIG. 7 is a circuit diagram showing a configuration example of a capacitor.

FIG. 7 is a sectional view of a semiconductor substrate showing a configuration example of the capacitor 104 shown in FIG. 6. For example, the capacitor 104 is an impurity diffusion region in which one electrode is made of polysilicon or metal and another electrode is made of silicon. A silicon (Si) substrate 601 contains an electrode 602 made of polysilicon or metal, a thin dielectric film 603 made of SiO, an electrode 604 of an impurity diffusion region formed in silicon, and a conductivity-type impurity diffusion region 605, called a well, designed to be different from the impurity diffusion region 604, and connected to a fixed voltage. The dielectric 603 is sandwiched between the electrodes 602 and 604, forming the capacitor 104. The electrode 604 is formed by an impurity diffusion region, forming a pn junction in conjunction with the impurity diffusion region 605 of a different conductivity type, and thereby generating a dark current. When a dark current is considered, if the electrode 604 is connected as the second electrode to the node N3 shown in FIG. 1 and FIGS. 3 to 6, an impact of the dark current can be prevented. This is because the dark current is absorbed by buffers (the transistors 107 and 108) or a fixed voltage node (the ground potential node), preventing potential fluctuations. This further improves the signal-to-noise ratio of the photoelectric conversion apparatus.

Also, when the photoelectric conversion element 101 is a photodiode, the output terminal of the photoelectric conversion element 101 is an impurity diffusion region made of silicon (node N1). In that case, the impurity diffusion region (node N1) of the output terminal of the photoelectric conversion element 101 and an impurity diffusion region of the first electrode 604 of the capacitor 104 can be configured to be of a same conductivity type and can be planarly interconnected directly. This will eliminate the need for wiring for connection between the photoelectric conversion element 101 and the capacitor 104, resulting in a reduced pattern layout area. Consequently, area of the photoelectric conversion apparatus can be reduced while maintaining the signal-to-noise ratio.

Fourth Embodiment

Figure 8:
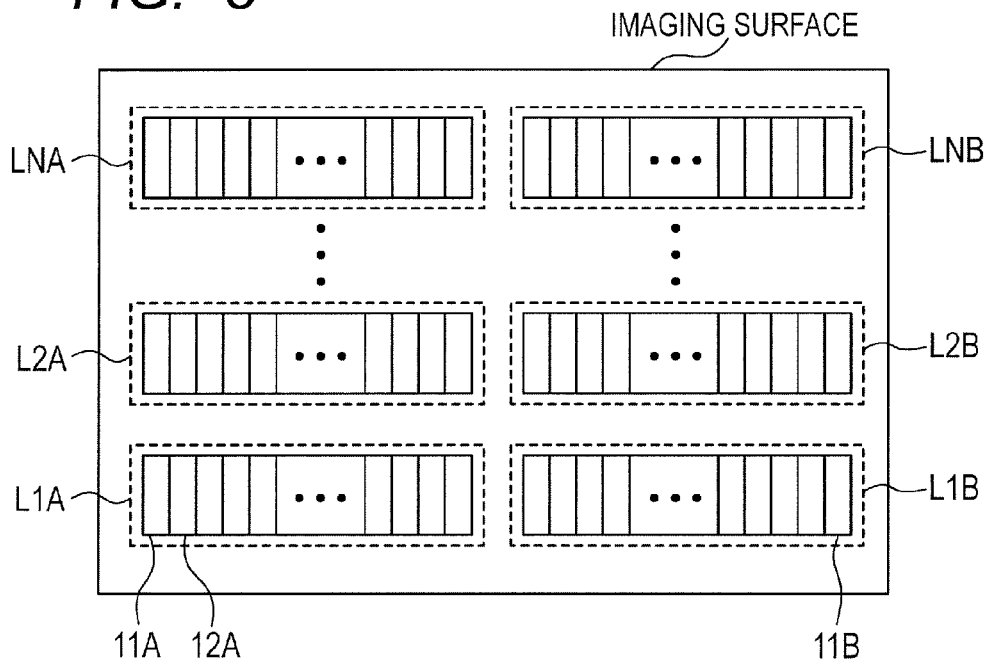
FIG. 8 is a diagram showing a configuration example of a photoelectric conversion apparatus for a phase difference AF.

FIG. 8 is a diagram schematically showing an imaging surface of the photoelectric conversion apparatus for phase difference AF (Auto Focusing). There are pairs of line sensor units L1A and L1B, L2A and L2B, . . . LNA and LNB on the imaging surface. Each pair of line sensor units is used to measure a defocus amount of a subject in a given region on the imaging surface and plural pairs of line sensor units are arranged to provide plural distance-measuring points, thereby improving AF accuracy. Each line sensor unit includes pixels 11A, 12A, . . . capable of operating in a low sensitivity mode and high sensitive mode. In the low sensitivity mode, a lower level of signal is output than in the high sensitive mode in response to the same amount of incident light. The read circuit is provided for plural line sensor units and signals output from the read circuit are monitored on a monitor unit (not shown). The pixels may be any of those described in the above embodiments. The read circuit may be shared by plural pixels or a read circuit may be provided individually for each pixel.

Figure 9:
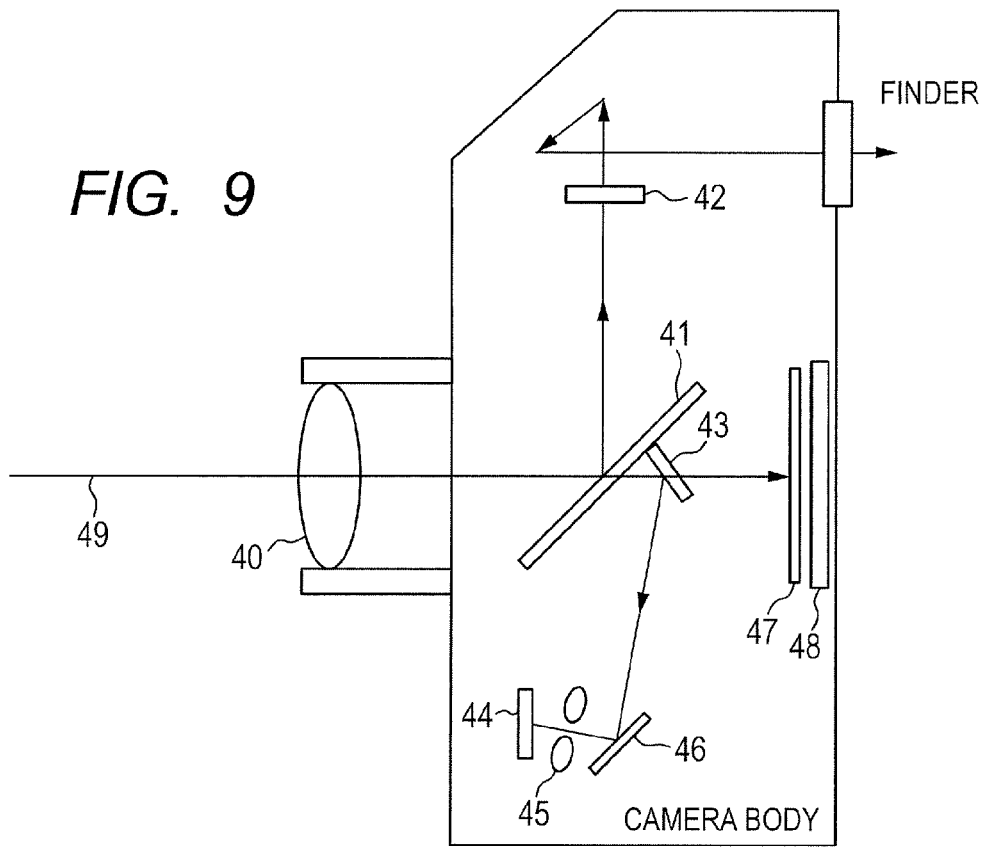
FIG. 9 is a diagram showing a configuration example of an imaging system.

FIG. 9 shows a schematic optical-system diagram of an imaging system equipped with a TTL-SIR (Through The Lens-Secondary Image Registration) autofocus system using the photoelectric conversion apparatus shown in FIG. 8. A single lens reflex camera is shown here by way of example. In FIG. 9, the single lens reflex camera includes a lens 40 adapted to focus a object image on a film and image sensing device (image sensor) on a primary basis and a quick return mirror 41 adapted to reflect light to a finder screen 42 and configured as a half mirror which transmits part of the incident light. Also, the single lens reflex camera includes a submirror 43 adapted to guide light to the AF system, the photoelectric conversion apparatus 44 (AF sensor) shown in FIG. 8, a secondary imaging lens 45 (eyeglass lens) adapted to refocus the object image on the AF sensor, a reflecting mirror 46 adapted to guide light to the AF sensor 44, a focal plane shutter 47, a film or image sensor 48, and a main axis 49 of a beam. The camera may further include an AE sensor as a light quantity detecting unit, and the mode to operate the photoelectric conversion apparatus can be switched between the first mode and second mode according to an amount of light on the subject obtained by the AE sensor.

In the above embodiments, an NMOS transistor which turns on when a logic-high voltage is applied to the gate has been described for the simplicity of explanation, but the present invention is also applicable to a PMOS transistor which turns on when a logic-low voltage is applied to the gate.

It should be noted that the embodiments described above merely illustrate concrete examples of carrying out the present invention and are not to be interpreted as limiting the true scope of the invention. That is, the present invention can be implemented in various forms without departing from the technical idea or major features of the invention.

The present invention can prevent dark current noise due to a leakage current of a transistor, and thereby improve the signal-to-noise ratio.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-047031, filed Mar. 8, 2013, which is hereby incorporated by reference herein in its entirety.

What is claimed is:

1. A photoelectric conversion apparatus comprising a pixel, wherein
the pixel includes:
a photoelectric conversion element configured to convert light to an electric charge;
a buffer having an input terminal connected to an output terminal of the photoelectric conversion element, to perform a buffering of a voltage based on the electric charge of the photoelectric conversion element;
a capacitor having a first electrode connected to the output terminal of the photoelectric conversion element;
a first switch connected between a second electrode of the capacitor and an output terminal of the buffer; and
a second switch connected between the second electrode of the capacitor and a fixed voltage node.

2. The photoelectric conversion apparatus according to claim 1, wherein
the first and second switches are MOS transistors.

3. The photoelectric conversion apparatus according to claim 1, further comprising
a reset portion connected to the output terminal of the photoelectric conversion element, and configured to reset the electric charge of the photoelectric conversion element, wherein
the reset portion has a MOS transistors configured to supply a reset voltage to the photoelectric conversion element.

4. The photoelectric conversion apparatus according to claim 1, further comprising
a reset portion connected to the output terminal of the photoelectric conversion element, and configured to reset the electric charge of the photoelectric conversion element, wherein
the reset portion has a diode connected to the output terminal of the photoelectric conversion element, and a bias portion a forward bias voltage or a reverse bias voltage to a cathode of the diode.

5. The photoelectric conversion apparatus according to claim 1, wherein
the buffer is a variable gain amplifier.

6. The photoelectric conversion apparatus according to claim 5, wherein
the variable gain amplifier has a gain 1 or less.

7. The photoelectric conversion apparatus according to claim 1, wherein
the second electrode of the capacitor is an impurity diffusion region formed in a silicon.

8. The photoelectric conversion apparatus according to claim 1, wherein
the first electrode of the capacitor is an impurity diffusion region formed in a silicon,
the output terminal of the photoelectric conversion element is an impurity diffusion region of which conductivity type is the same as the conductivity type of the impurity diffusion region of the first electrode of the capacitor, and
the first electrode of the capacitor and the output terminal of the photoelectric conversion element are connected mutually through an impurity diffusion region.

9. The photoelectric conversion apparatus according to claim 1, wherein
the photoelectric conversion apparatus comprising a plurality of the pixels.

10. The photoelectric conversion apparatus according to claim 1, wherein
the first switch turns ON and the second switch turns OFF in a first mode, and
the first switch turns OFF and the second switch turns ON in a second mode.

11. An imaging system comprising:
the photoelectric conversion apparatus according to claim 10; and
a light quantity detecting unit, wherein
the photoelectric conversion apparatus performs a switching between the first and second modes, based on an output of the light quantity detecting unit.

* * * * *